(12) United States Patent
Rice

(10) Patent No.: US 10,070,022 B2
(45) Date of Patent: Sep. 4, 2018

(54) ELONGATED FLEXIBLE CHILD MONITOR

(71) Applicant: Boogli, Inc., Panama City Beach, FL (US)

(72) Inventor: Todd Rice, Panama City Beach, FL (US)

(73) Assignee: Boogli, Inc., Panama City Beach, FL (US)

( * ) Notice: Subject to any disclaimer, the term of this patent is extended or adjusted under 35 U.S.C. 154(b) by 254 days.

(21) Appl. No.: 15/002,037

(22) Filed: Jan. 20, 2016

(65) Prior Publication Data

US 2017/0208225 A1    Jul. 20, 2017

(51) Int. Cl.
| H04N 5/225 | (2006.01) |
| H04N 5/232 | (2006.01) |
| G06T 7/20 | (2017.01) |
| G06K 9/00 | (2006.01) |

(52) U.S. Cl.
CPC ....... H04N 5/2252 (2013.01); G06K 9/00771 (2013.01); G06T 7/20 (2013.01); H04N 5/23293 (2013.01); *G06T 2207/30196* (2013.01)

(58) Field of Classification Search
CPC .................................. H04N 5/2252
USPC ........................................ 348/143
See application file for complete search history.

(56) References Cited

U.S. PATENT DOCUMENTS

| 8,390,255 B1 | 3/2013 | Fathollahi | |
| 8,442,661 B1 * | 5/2013 | Blackwell | B25J 9/1689 700/245 |
| 8,796,989 B2 | 8/2014 | Lee et al. | |
| 8,981,713 B2 | 3/2015 | Lee et al. | |
| 9,294,601 B2 | 3/2016 | Hammond et al. | |
| 9,306,611 B2 | 4/2016 | Coverstone et al. | |
| 2008/0216233 A1 * | 9/2008 | Butlin | A47D 15/008 5/100 |
| 2009/0072782 A1 | 3/2009 | Randall | |
| 2011/0074344 A1 | 3/2011 | Park et al. | |
| 2013/0143519 A1 | 6/2013 | Doezema | |
| 2014/0172561 A1 | 6/2014 | Moon et al. | |
| 2014/0375258 A1 | 12/2014 | Arkhipenkov et al. | |
| 2015/0195397 A1 | 7/2015 | Rice | |

FOREIGN PATENT DOCUMENTS

WO    WO 2013/154857    10/2013

* cited by examiner

*Primary Examiner* — Yulin Sun
(74) *Attorney, Agent, or Firm* — McCarter & English, LLP

(57) ABSTRACT

Improved monitor assemblies (e.g., child monitor assemblies) and related methods of use are provided. More particularly, the present disclosure provides improved child monitor assemblies having an elongated flexible section configured and dimensioned to be positioned into various desired positions for a wide range of different viewing angles and/or locations. The present disclosure provides for a monitor assembly (e.g., character-based monitor assembly) including a base/body portion, an elongated flexible portion attached to and extending from the base/body portion, and a head/upper portion attached to and extending from the elongated flexible portion. The head/upper portion includes an eye member, with a monitor member (e.g., camera, video monitor) positioned/placed within or near the eye member. The elongated flexible portion is configured and dimensioned to be positioned into various desired positions for a wide range of different viewing angles and/or locations for the monitor member.

19 Claims, 7 Drawing Sheets

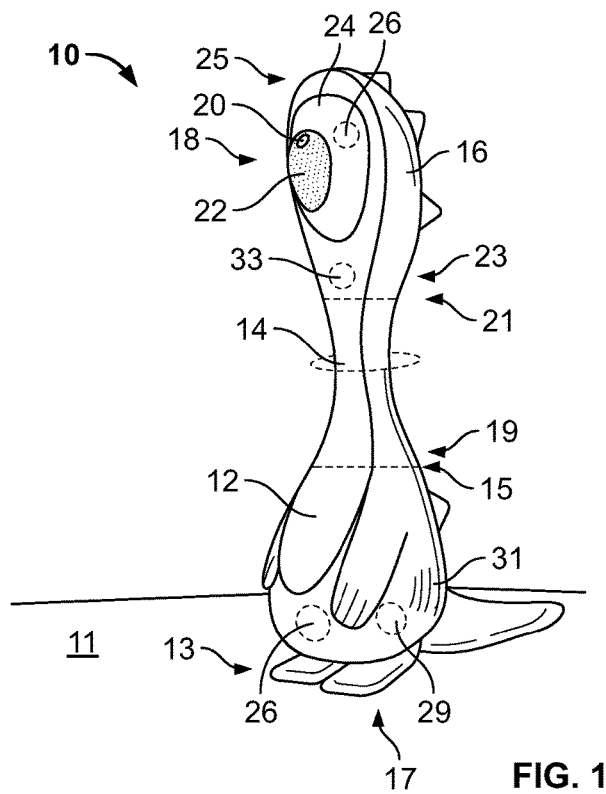
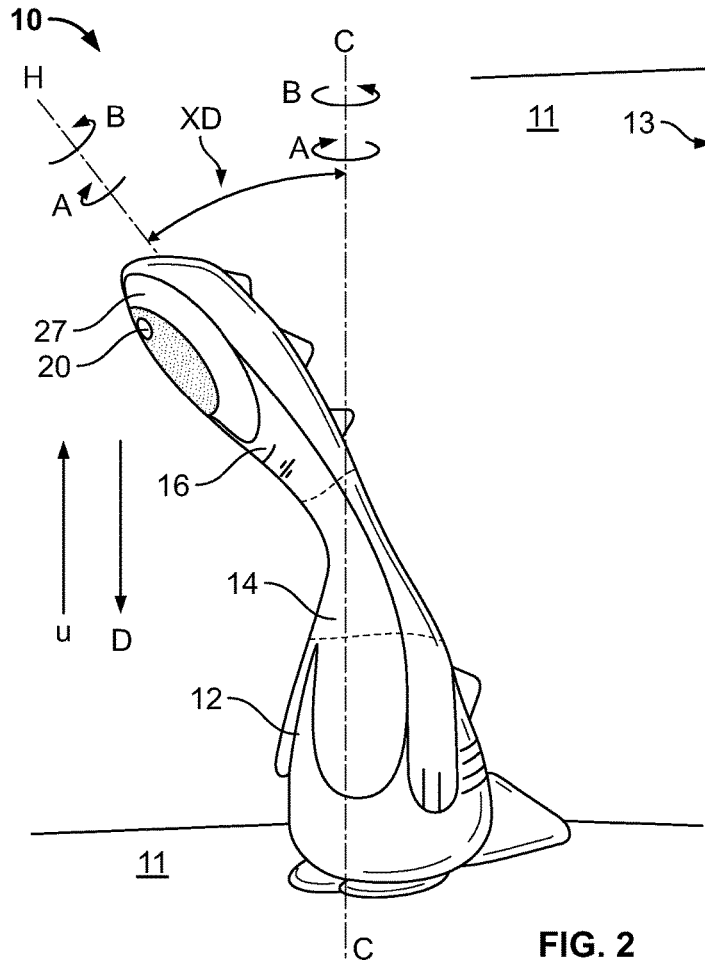
FIG. 1
FIG. 2

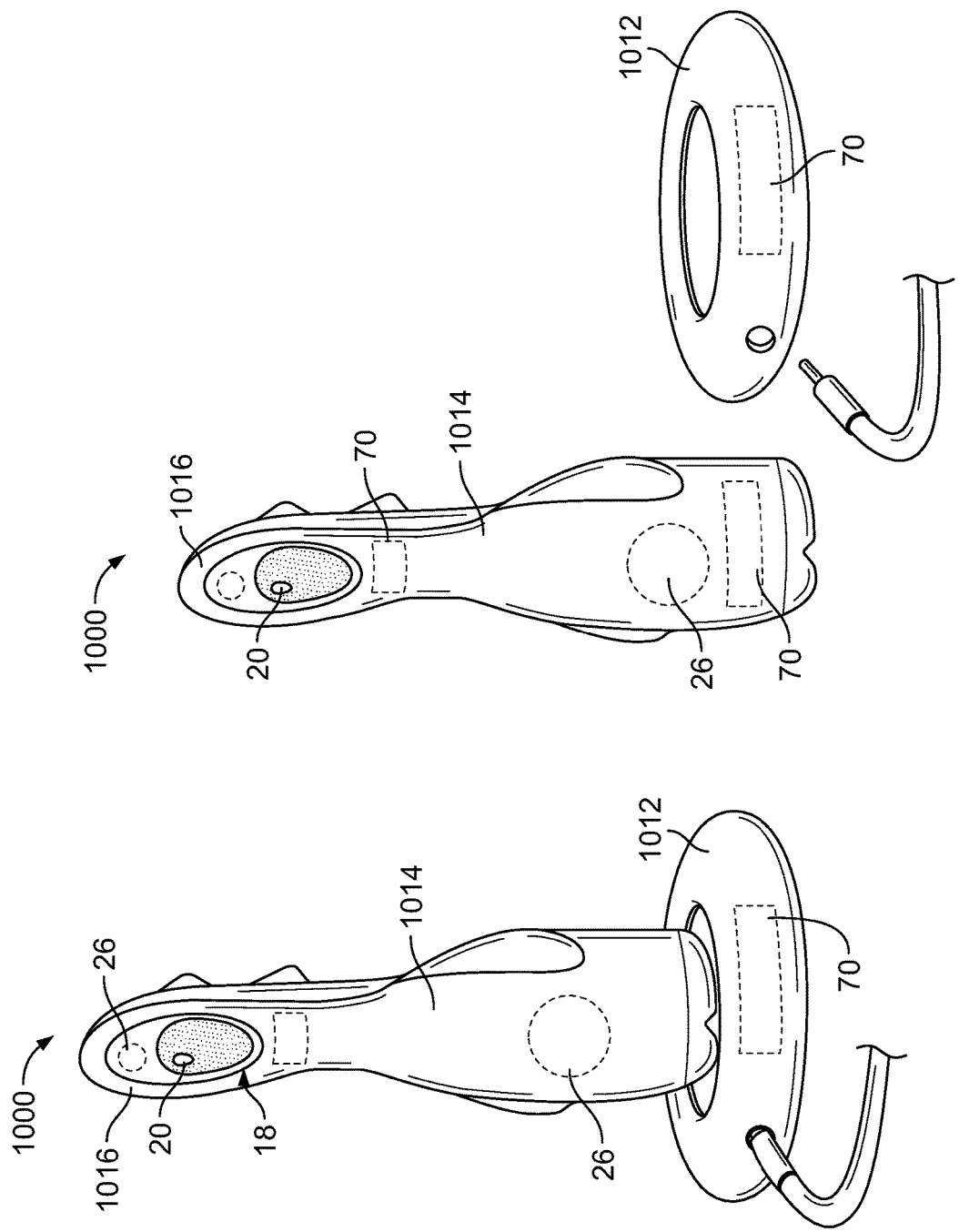

ELONGATED FLEXIBLE CHILD MONITOR

FIELD OF THE DISCLOSURE

The present disclosure relates to monitor assemblies (e.g., child monitor assemblies) and related methods of use and, more particularly, to child monitor assemblies having an elongated flexible section configured and dimensioned to be positioned into various desired positions for a wide range of viewing angles and/or locations.

BACKGROUND OF THE DISCLOSURE

In general, child monitor assemblies are known. In general, child/security monitors come in various shapes and sizes. Conventional child/security monitors can make it difficult and/or inconvenient to position such assemblies into desired locations.

Many existing child/video monitors have very short battery power and extremely short ranges in which to be physically away from the child and still see the child on the camera/monitor. Traditional video monitors are also difficult to set up in the child's room in order to get desired angles for viewing. For example, parents often rely on such assemblies to monitor their child in his or her room, which can be difficult to get the proper angle of view.

Moreover, there is generally not much difference in the way of appearance for these conventional security/child monitors. They generally mostly look like some type of security camera/monitor, and not much appeals to the different aesthetics of the room in which they are positioned.

As such, a need exists to develop monitor assemblies that are convenient and/or include improved features/structures.

Thus, an interest exists for improved monitor assemblies, and related methods of use. These and other inefficiencies and opportunities for improvement are addressed and/or overcome by the assemblies, systems and methods of the present disclosure.

SUMMARY OF THE DISCLOSURE

The present disclosure provides advantageous monitor assemblies (e.g., child monitor assemblies), and related methods of use. More particularly, the present disclosure provides advantageous child monitor assemblies (e.g., character-based monitor assemblies) having an elongated flexible section configured and dimensioned to be positioned into various desired positions for a wide range of different viewing angles and/or locations for monitoring purposes.

In exemplary embodiments, the present disclosure provides for a character-based monitor assembly including a base/body portion, an elongated flexible neck portion attached to and extending from the base/body portion, and a head/upper portion attached to and extending from the elongated flexible neck portion. In general, the head/upper portion includes an eye member, with a monitor member (e.g., camera, video monitor) positioned/placed within or near the eye member. The elongated flexible neck portion can be configured and dimensioned to be positioned into various desired positions for a wide range of different viewing angles and/or locations for the monitor member of the eye member of the head/upper portion (e.g., for monitoring purposes).

The present disclosure provides for a monitor assembly including a base portion; an elongated flexible portion attached to and extending from the base portion; an upper portion attached to and extending from the elongated flexible portion, the upper portion including an eye member, with a monitor member positioned within or near the eye member; wherein the elongated flexible portion is configured and dimensioned to be positioned into various user-defined positions for a range of different viewing angles or locations for the monitor member of the eye member of the upper portion.

The present disclosure also provides for a monitor assembly wherein the monitor assembly is a character-based monitor assembly with the base portion including a body portion; wherein the elongated flexible portion includes an elongated flexible neck portion attached to and extending from the body portion; and wherein the upper portion includes a head portion attached to and extending from the elongated flexible neck portion, the head portion including the eye member.

The present disclosure also provides for a monitor assembly wherein a lens of the monitor member is positioned or mounted within a pupil area of the eye member; and wherein an area of the eye member surrounding the pupil area includes a lighting component or an LCD screen.

The present disclosure also provides for a monitor assembly wherein the base portion is configured and dimensioned to be mounted on a surface with a central axis of the base portion and a central axis of the upper portion substantially positioned together; and wherein the elongated flexible portion is configured and dimensioned to be flexed and moved toward the surface to a user-defined position with the central axis of the upper portion angled at a user-defined angle relative to the central axis of the base portion.

The present disclosure also provides for a monitor assembly wherein the central axis of the upper portion is angled from at least about 45° to about 90° relative to the central axis of the base portion. The present disclosure also provides for a monitor assembly wherein the elongated flexible portion is configured and dimensioned to be flexed and moved toward the surface to a user-defined position with the upper portion contacting the base portion.

The present disclosure also provides for a monitor assembly wherein the elongated flexible portion and the upper portion are configured and dimensioned to be rotated and moved from about 180° to about 360° in a first rotational direction around a central axis of the base portion; and wherein the elongated flexible portion and the upper portion are configured and dimensioned to be rotated and moved from about 180° to about 360° in a second rotational direction around the central axis of the base portion.

The present disclosure also provides for a monitor assembly wherein the elongated flexible portion is configured and dimensioned to be flexed and moved to a position where at least a portion of the elongated flexible portion is wrapped 360° around an object. The present disclosure also provides for a monitor assembly wherein the base portion or the upper portion includes a motion sensor; and wherein after the motion sensor senses motion, the lighting component or the LCD screen is configured and adapted to illuminate or blink.

The present disclosure also provides for a monitor assembly wherein the upper portion or the base portion includes a wireless adapter, the wireless adapted configured to wirelessly transmit information, images or recordings from the monitor member to a remote electronic device; and wherein the remote electronic device is configured to send command signals to the wireless adapter to control the monitor member.

The present disclosure also provides for a monitoring method including providing a monitor assembly having a base portion, an elongated flexible portion attached to and extending from the base portion and an upper portion attached to and extending from the elongated flexible portion, the upper portion including an eye member, with a monitor member positioned within or near the eye member; wherein the elongated flexible portion is configured and dimensioned to be positioned into various user-defined positions for a range of different viewing angles or locations for the monitor member of the eye member of the upper portion; and positioning the elongated flexible portion into one of the user-defined positions for monitoring purposes via the monitor member.

The present disclosure also provides for a monitoring method wherein the monitor assembly is a character-based monitor assembly with the base portion including a body portion; wherein the elongated flexible portion includes an elongated flexible neck portion attached to and extending from the body portion; and wherein the upper portion includes a head portion attached to and extending from the elongated flexible neck portion, the head portion including the eye member.

The present disclosure also provides for a monitoring method wherein a lens of the monitor member is positioned or mounted within a pupil area of the eye member; and wherein an area of the eye member surrounding the pupil area includes a lighting component or an LCD screen. The present disclosure also provides for a monitoring method further including mounting the base portion on a surface with a central axis of the base portion and a central axis of the upper portion substantially positioned together; and flexing and moving the elongated flexible portion toward the surface to a user-defined position with the central axis of the upper portion angled at a user-defined angle relative to the central axis of the base portion.

The present disclosure also provides for a monitoring method wherein the central axis of the upper portion is angled from at least about 45° to about 90° relative to the central axis of the base portion. The present disclosure also provides for a monitoring method wherein the elongated flexible portion is flexed and moved toward the surface to a user-defined position with the upper portion contacting the base portion.

The present disclosure also provides for a monitoring method further including rotating and moving the elongated flexible portion and the upper portion from about 180° to about 360° in a first rotational direction around a central axis of the base portion; and rotating and moving the elongated flexible portion and the upper portion from about 180° to about 360° in a second rotational direction around the central axis of the base portion.

The present disclosure also provides for a monitoring method further including flexing and moving the elongated flexible portion to a position where at least a portion of the elongated flexible portion is wrapped 360° around an object.

The present disclosure also provides for a monitoring method wherein the base portion or the upper portion includes a motion sensor; and wherein after the motion sensor senses motion, the lighting component or the LCD screen is configured and adapted to illuminate or blink.

The present disclosure also provides for a monitoring method wherein the upper portion or the base portion includes a wireless adapter, the wireless adapted configured to wirelessly transmit information, images or recordings from the monitor member to a remote electronic device; and further including sending command signals from the remote electronic device to the wireless adapter to control the monitor member.

The present disclosure also provides for a character-based monitor assembly including a body portion and an elongated flexible neck portion attached to and extending from the body portion, with a head portion attached to and extending from the elongated flexible neck portion, the head portion including an eye member, with a monitor member positioned within or near the eye member; wherein the elongated flexible neck portion is configured and dimensioned to be positioned into various user-defined positions for a range of different viewing angles or locations for the monitor member of the eye member of the head portion; wherein a lens of the monitor member is positioned or mounted within a pupil area of the eye member, and an area of the eye member surrounding the pupil area includes a lighting component or an LCD screen; wherein the body portion or the head portion includes a motion sensor, and after the motion sensor senses motion, the lighting component or the LCD screen is configured and adapted to illuminate or blink; wherein the body portion is configured to be mounted on a surface with a central axis of the body portion and a central axis of the head portion substantially positioned together; wherein the elongated flexible neck portion is configured and dimensioned to be flexed and moved toward the surface to a user-defined position with the central axis of the head portion angled at a user-defined angle relative to the central axis of the body portion; wherein the elongated flexible neck portion and the head portion are configured and dimensioned to be rotated and moved from about 180° to about 360° in a first rotational direction around a central axis of the base portion; wherein the elongated flexible neck portion and the head portion are configured and dimensioned to be rotated and moved from about 180° to about 360° in a second rotational direction around the central axis of the body portion; wherein the head portion or the body portion includes a wireless adapter, the wireless adapted configured to wirelessly transmit information, images or recordings from the monitor member to a remote electronic device; and wherein the remote electronic device is configured to send command signals to the wireless adapter to control the monitor member.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a side perspective view of an exemplary character-based monitor assembly according to the present disclosure;

FIG. 2 is another side perspective view of the assembly of FIG. 1;

FIGS. 10A-10B depict another exemplary monitor assembly of the present disclosure.

DETAILED DESCRIPTION OF DISCLOSURE

Figure 3:
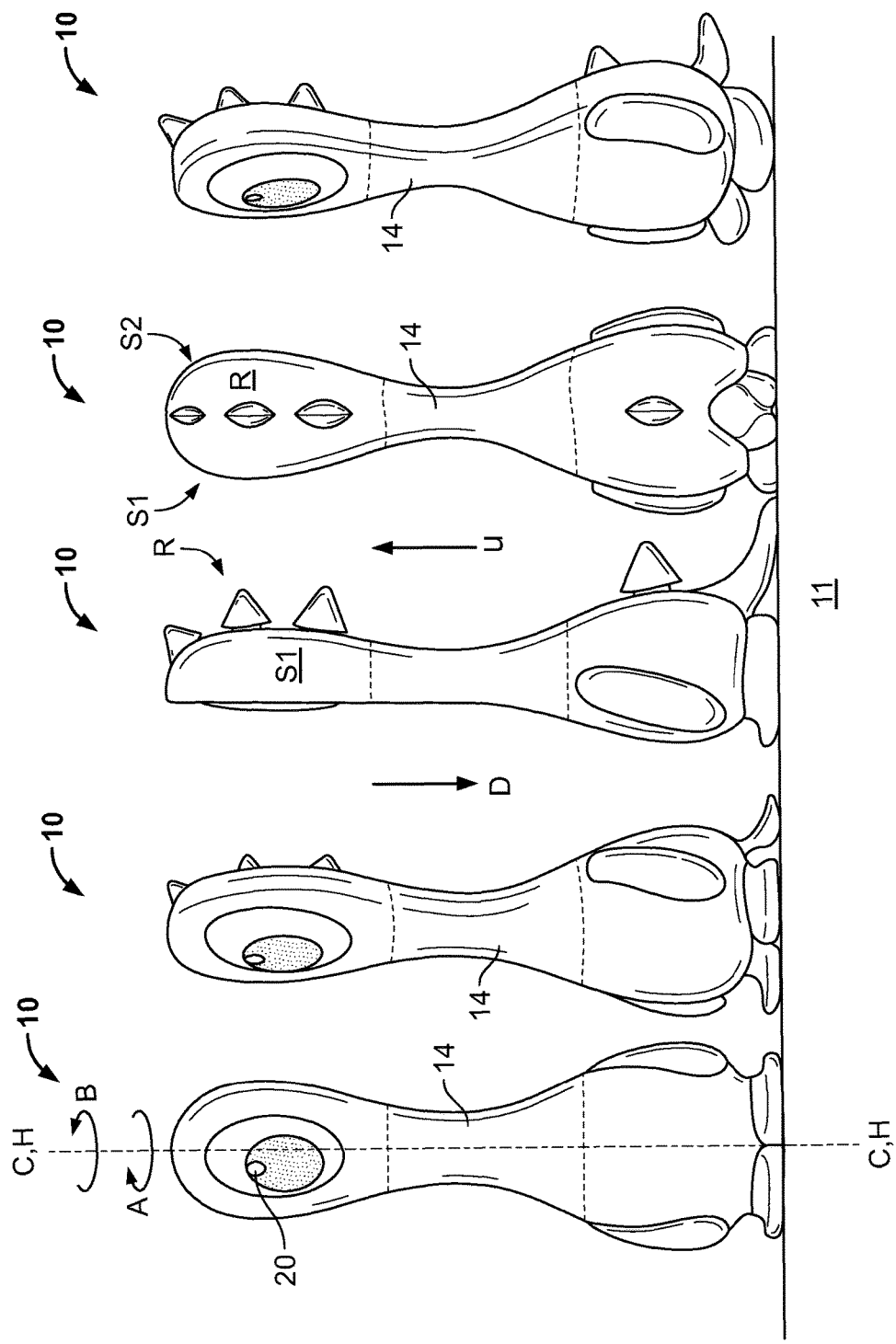
FIG. 3A is a front view of the assembly of FIG. 1.
FIG. 3B is another side perspective view of the assembly of FIG. 1.
FIG. 3C is a side view of the assembly of FIG. 1.
FIG. 3D is rear view of the assembly of FIG. 1.
FIG. 3E is another side perspective view of the assembly of FIG. 1.

The exemplary embodiments disclosed herein are illustrative of advantageous monitor assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary monitor assemblies/fabrication methods and associated processes/techniques of assembly and use are not to be interpreted as limiting, but merely as the basis for teaching one skilled in the art how to make and use the advantageous monitor assemblies/systems and/or alternative monitor assemblies of the present disclosure.

The present disclosure provides improved monitor assemblies (e.g., child monitor assemblies), and related methods of use. More particularly, the present disclosure provides improved child monitor assemblies (e.g., character-based monitor assemblies) having an elongated flexible section configured and dimensioned to be positioned into various desired positions for a wide range of different viewing angles and/or locations.

In general, the present disclosure provides for a monitor assembly (e.g., character-based monitor assembly) including a base/body portion, an elongated flexible portion (e.g., elongated flexible neck portion) attached to and extending from the base/body portion, and a head/upper portion attached to and extending from the elongated flexible portion. The exemplary head/upper portion includes an eye member, with a monitor member (e.g., camera, video monitor) positioned/placed within or near the eye member. The elongated flexible portion is configured and dimensioned to be positioned into various desired positions for a wide range of different viewing angles and/or locations for the monitor member of the eye member of the head/upper portion (e.g., for monitoring purposes).

Current practice provides that conventional child monitors can be difficult to set up in the child's room in order to get desired angles for viewing. In exemplary embodiments, the present disclosure provides for improved monitor assemblies having an elongated flexible section configured and dimensioned to be positioned into various desired positions for a wide range of different viewing angles and/or locations for monitoring purposes, thereby providing a significant operational, commercial and/or manufacturing advantage as a result.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 1, 2 and 3A-3E, there is illustrated an exemplary embodiment of a monitor assembly 10 (e.g., character-based monitor assembly 10) according to the present disclosure. In general, monitor assembly 10 includes an elongated section/portion 14 configured and dimensioned to be positioned into various user-defined positions for a wide range of different viewing angles and/or locations for monitoring purposes of monitor assembly 10 (e.g., FIGS. 1 and 2). However, in some embodiments, elongated portion 14 may not be flexible/movable.

Exemplary monitor assembly 10 includes a base portion 12, an elongated flexible/bendable/deformable portion 14 attached to and extending from the base portion 12, and an upper portion 16 attached to and extending from the elongated flexible portion 14. Exemplary upper portion 16 includes an eye member 18, with a monitor member 20 (e.g., camera 20, video monitor 20, etc.) positioned/mounted within or near the eye member 18. In general, the elongated flexible portion 14 is configured and dimensioned to be positioned/mounted and/or flexed/deformed into various user-defined positions (FIGS. 1 and 2) for a wide range of different viewing angles or locations for the monitor member 20 of the eye member 18 of the upper portion 16 (e.g., for child monitoring purposes). Exemplary monitor member 20 is configured and adapted to record video/images and/or capture still images. In some embodiments and as discussed further below, monitor member 20 is configured and adapted to take instant photographs, and monitor member 20 can include night vision or the like.

In certain embodiments, portions 12 and 16 are not configured to be flexible portions (e.g., are not similarly flexible like portion 14), although the present disclosure is not limited thereto. Rather, it is noted that at least a part of portions 12 and/or 16 could flex and/or be flexible similar to (or in lieu of) portion 14. Moreover, it is noted that monitor member 20 could be positioned and/or mounted on any suitable position on assembly 10 (e.g., on portion 16, on portion 14, on portion 12). Additionally, it is noted that assembly 10 could include any suitable number of monitor members 20 (e.g., one, two, three, a plurality of monitor members 20, etc.), with each monitor member 20 mounted on any suitable position/location on assembly 10 (e.g., on portion 16, on portion 14, on portion 12). In certain embodiments, at least a portion of assembly 10 is substantially waterproof.

In general, base portion 12 is elongated and substantially plastic-based, although the present disclosure is not limited thereto. Rather, it is noted that base portion 12 can be fabricated from a variety of suitable materials and/or combination of materials, and can take a variety of shapes/forms.

As shown in FIG. 1, base portion 12 extends from a first end 13 to a second end 15. Exemplary bottom surface/side 17 of the first end 13 of the base portion 12 is configured and dimensioned to be mounted on or positioned on a surface 11 or the like. In some embodiments, base portion 12 may use adhesives or magnets (e.g., on bottom side 17 and/or surface 11) for mounting purposes. In some embodiments, it is also noted that second end 25 of upper portion 16 can be configured and dimensioned to be mounted on or positioned on surface 11 or the like (e.g., upper portion 16 can be mounted on surface 11, and/or base portion 12 can be mounted on surface 11).

In certain embodiments and as discussed further below, base portion 12 can include a speaker 29 and a speaker vent 31, and can include a microphone to receive outside noise input and a microphone port on base portion 12.

In general, elongated flexible portion 14 extends from a first end 19 to a second end 21, and upper portion 16 extends from a first end 23 to a second end 25. In exemplary embodiments, first end 19 of elongated flexible portion 14 is attached to and/or extends from the second end 15 of base portion 12, and the first end 23 of upper portion 16 is attached to and/or extends from the second end 21 of portion 14.

In general, elongated portion 14 includes or is fabricated from a flexible/bendable material or the like (e.g., composite resin or vinyl material, etc.). Elongated portion 14 can also include a plastic-based material or the like. It is noted that elongated flexible portion 14 can be fabricated from a variety of suitable materials and/or combination of materials, and can take a variety of shapes/forms.

Exemplary upper portion 16 is substantially plastic-based, although the present disclosure is not limited thereto. Rather, it is noted that upper portion 16 can be fabricated from a variety of suitable materials and/or combination of materials, and can take a variety of shapes/forms.

As noted and in certain embodiments, monitor assembly 10 takes the form of a character-based monitor assembly 10 or the like (e.g., FIG. 1). In general, a character of a character-based monitor assembly 10 can include fictional or non-fictional people, animals, plants, figures, organisms or other characters/shapes (e.g., professional football players; characters/shapes possessing anthropomorphic and/or animalistic features; movie-characters or figures/animals; fictional monsters/creatures; etc.). For example, a character of a character-based monitor assembly 10 can take the form of a licensed character or the like (e.g., professional sports figure) and/or can take the form of a custom-made character or figure or the like.

In some embodiments and as shown in FIGS. 1, 2 and 3A-3E, monitor assembly 10 is a character-based monitor assembly 10, with at least a portion of the base portion 12 taking the form of a body portion 12, and with at least a portion of the elongated flexible portion 14 taking the form of an elongated flexible neck portion 14 that is attached to and extends from the body portion 12, and with the upper portion 16 taking the form of a head portion 16 that is attached to and extends from the elongated flexible neck portion 14, with the head portion 16 including the eye member 18.

As shown in FIGS. 1, 2 and 3A-3E, exemplary body portion 12 is elongated and typically includes various body parts/features (e.g., torso, tail, arms, legs, feet, etc.), although the present disclosure is not limited thereto. Similarly, exemplary head portion 16 is elongated and typically includes various body parts/features (e.g., eye member 18, nose, mouth, etc.), although the present disclosure is not limited thereto. It is noted that body portion 12, neck portion 14 and/or head portion 16 can take a variety of shapes/forms, and can include a variety of features/structures (e.g., character-based features/structures).

As noted, elongated flexible portion 14 is configured and dimensioned to be positioned into various desired (user-defined) positions for a wide range of different viewing angles and/or locations for monitoring purposes of monitor assembly 10.

For example and as shown in FIGS. 2 and 3A, the monitor assembly 10 can be in a first position shown in FIG. 3A with the central axis C of the base portion 12 and the central axis H of the upper portion 16 substantially positioned the same or together (e.g., axis C and H substantially parallel to and running alongside one another).

A user can then flex/move the flexible portion 14 towards surface 11 in the general direction of Arrow D until the upper portion 16 is positioned as shown in FIG. 2, with the central axis H of the upper portion 16 angled at a user-defined angle XD (e.g., about 45°) relative to the central axis C of the base portion 12. As such, the monitor member 20 of assembly 10 in FIG. 2 is now positioned for a different viewing angle/position as compared to the angle/position of monitor member 20 of assembly 10 in FIG. 1 or 3A. If desired, the user can thereafter move flexible portion 14 in the direction of Arrow U until upper portion 16 is positioned as shown in FIG. 3A, or until upper portion 16 is positioned in another desired monitoring position relative to central axis C and/or surface 11.

In certain embodiments, flexible portion 14 is configured to be moved/flexed until the central axis H of the upper portion 16 is angled at least about 90° relative to the central axis C of the base portion 12. In some embodiments, flexible portion 14 is configured to be moved/flexed until the central axis H of the upper portion 16 is about angled 180° relative to its initial starting point when positioned along with the central axis C of the base portion 12.

It is noted that flexible portion 14 can be configured to move toward or away from surface 11 (e.g., in the direction of Arrow D or U) in a 360° manner. For example and as noted, the flexible portion 14 and upper portion 16 can be moved in a substantially forward direction toward surface 11 as depicted in FIG. 2 (e.g., from the position shown in FIG. 3A). Alternatively, the flexible portion 14 and upper portion 16 can be moved in a first substantially sideways direction toward surface 11 so that a side S1 (FIG. 3D) of upper portion 16 is moved toward and/or contacts surface 11, or portions 14, 16 can be moved in a second substantially sideways direction toward surface 11 so that a side S2 of upper portion 16 is moved toward surface 11 and/or contacts surface 11. Still further, the flexible portion 14 and upper portion 16 can be moved in a backwards or rearward direction toward surface 11 so that a rear-side R of upper portion 16 is moved toward surface 11. Such movements/flexes may be performed in a substantially 360° manner around portions 14, 16 and toward surface 11 (and conversely away from surface 11).

It is also noted that flexible portion 14 and upper portion 16 can be configured to be flexed, moved and/or rotated (via flexible portion 14) at least 45° in the direction of Arrow A around axis C when assembly 10 is in the position shown in FIG. 3A, and/or flexible portion 14 and portion 16 can be configured to be flexed, moved and/or rotated at least 45° in the direction of Arrow B around axis C when assembly 10 is in the position shown in FIG. 3A (e.g., or around axis H in FIG. 2). In some embodiments, flexible portion 14 and portion 16 can be configured to be flexed, moved and/or rotated at least 180° in the direction of Arrow A when assembly 10 is in the position shown in FIG. 3A, and/or flexible portion 14 and portion 16 can be configured to be flexed, moved and/or rotated at least 180° in the direction of Arrow B when assembly 10 is in the position shown in FIG. 3A. In exemplary embodiments, flexible portion 14 and portion 16 can be configured to be flexed, moved and/or rotated 360° or more in the direction of Arrow A when assembly 10 is in the position shown in FIG. 3A, and/or flexible portion 14 and portion 16 can be configured to be flexed, moved and/or rotated 360° or more in the direction of Arrow B when assembly 10 is in the position shown in FIG. 3A.

As such, a user may also first move the flexible portion 14 to the position shown in FIG. 2, and then rotate the flexible portion 14 and portion 16 in the direction of Arrow A or Arrow B, as desired, for further different viewing angles and/or locations for monitoring purposes of monitor member 20 of monitor assembly 10.

In further non-limiting examples, the flexible portion 14 may be moved/flexed so that upper portion 16 is rotated/positioned along any position in the direction of Arrow A or B (FIG. 3A), and then flexible portion 14 and upper portion 16 can be moved/flexed towards surface 11 a suitable amount so that axis H is angled relative to axis C. In some embodiments, flexible portion 14 and upper portion 16 can be moved/flexed towards surface 11 so that upper portion 16 touches or contacts base portion 12 (e.g., in a forwards direction, in a sideways directions, in a rearwards direction, etc.). In other embodiments and as discussed further below, flexible portion 14 can be moved/flexed so that it is positioned around and/or is mounted relative to other objects (e.g., doorknobs, slats/bars of cribs, etc.). Stated another way, elongated flexible portion 14 can be configured and dimensioned to be flexed and moved to a position where at least a portion of the elongated flexible portion 14 is wrapped 360° around an object.

In certain embodiments, flexible portion 14 is configured to be stretched or retracted or the like. For example, a user could move the flexible portion 14 (and portion 16) substantially straight upwards in the direction of Arrow U to make the assembly 10 taller in height. Similarly, a user could then push flexible portion 14 (and portion 16) substantially straight downwards in the direction of Arrow D to make the assembly 10 shorter in height.

Thus, flexible portion 14 is configured and dimensioned to be positioned into various desired positions for a wide range of different viewing angles and/or locations for monitoring purposes of monitor member 20 of monitor assembly 10.

As noted above, flexible portion 14 can be moved/flexed so that it is positioned around and/or is mounted relative to other objects (e.g., bedposts, doorknobs, slats/bars of cribs, etc.). In exemplary embodiments and as shown in FIGS. 4A-4C and 5, flexible portion 14 of monitor assembly 10' is configured and dimensioned to be moved/flexed so that it is positioned around and/or is mounted relative to various objects/structures.

Figure 4:
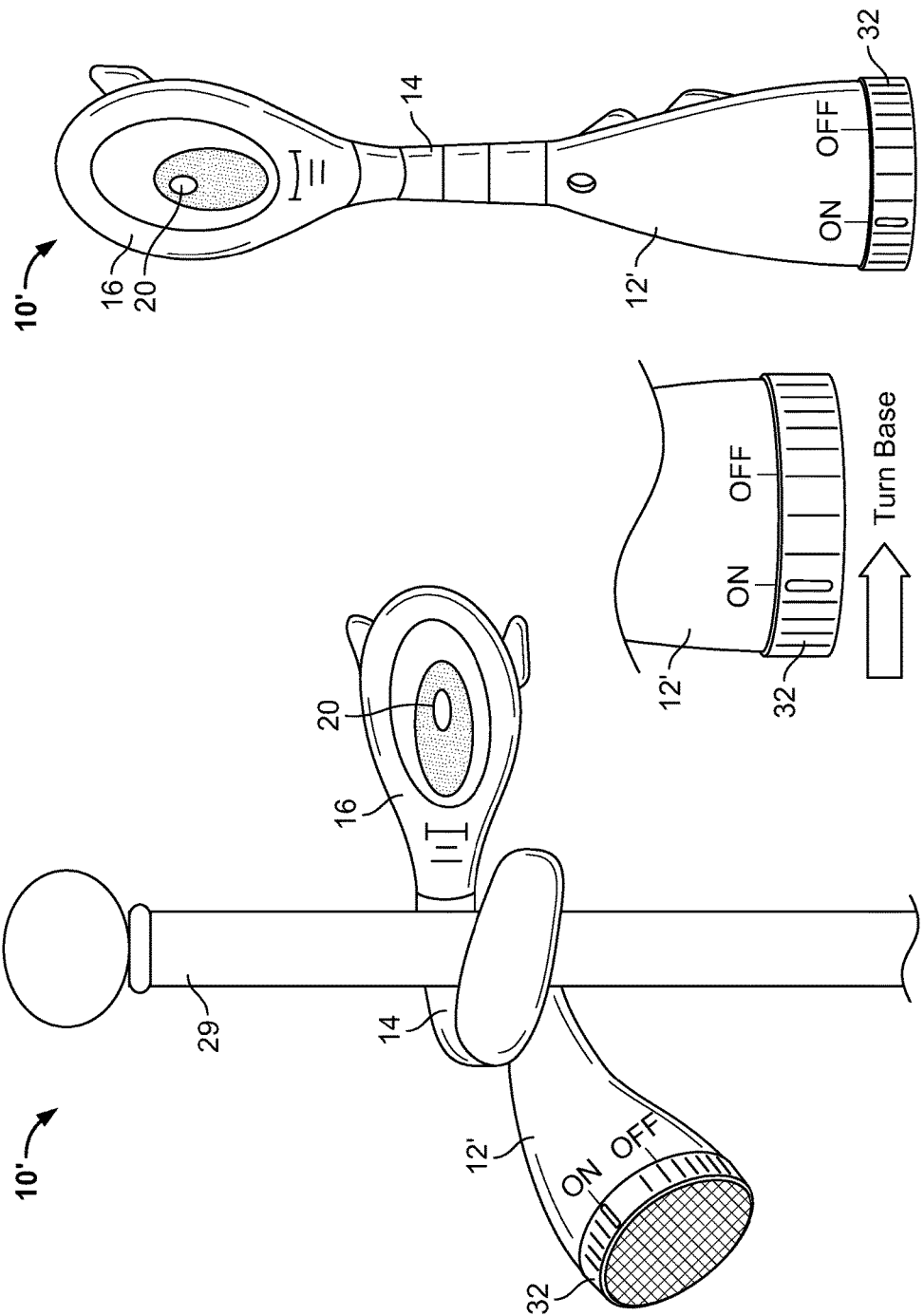
FIGS. 4A-4C and 5 depict an exemplary monitor assembly of the present disclosure.
Figure 5:
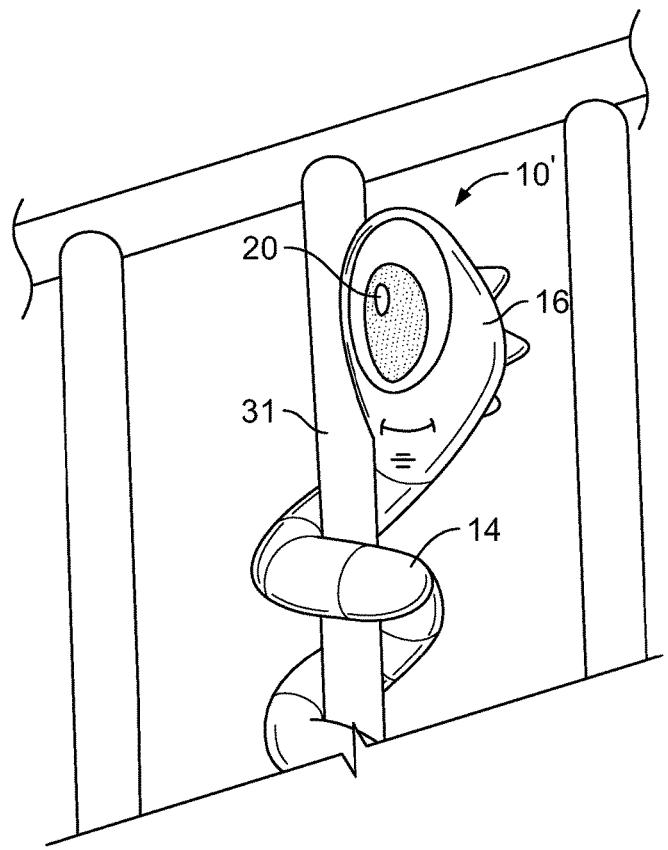

For example and as shown in FIG. 4A, flexible portion 14 of monitor assembly 10' is configured and dimensioned to be moved/flexed so that it is positioned around (e.g., wrapped around) and/or is mounted relative to a post member 29 or the like (e.g., bedpost 29). In another example and as shown in FIG. 5, flexible portion 14 of monitor assembly 10' is configured and dimensioned to be moved/flexed so that it is positioned around and/or is mounted relative to a slat/bar member 31 or the like (e.g., slat/bar 31 of crib). As such, flexible portion 14 is configured and dimensioned to be positioned into various desired positions for a wide range of different viewing angles and/or locations for monitoring purposes of monitor member 20 of upper portion 16 of monitor assembly 10' (or assembly 10 discussed above). It is noted that monitor assembly 10' (e.g., flexible portion 14) may use adhesives or magnets for mounting purposes (e.g., to members 29, 31).

As shown in FIGS. 4A-4C, the base portion 12' of monitor assembly 10' can include a movable portion 32 that is configured and dimensioned to be moved (e.g., rotated) relative to base portion 12' from an On position to an Off position (e.g., to turn monitor assembly 10' on or off).

Figure 6:
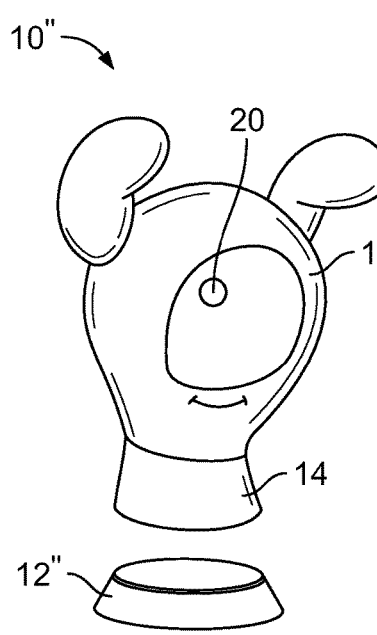
FIG. 6 is another exemplary monitor assembly of the present disclosure.

In another embodiment and as shown in FIG. 6, the base portion 12" of monitor assembly 10" can be configured and dimensioned to allow flexible portion 14 and upper portion 16 to be moved (e.g., rotated) relative to base portion 12" (or vice versa). As such and for example, a user can rotate flexible portion 14 and upper portion 16 relative to base portion 12" to put the monitor member 20 of upper portion 16 in a desired position. A user can then also move flexible portion 14 and upper portion 16 via flexing/moving of flexible portion 14 as desired, and as discussed above.

Figure 7:
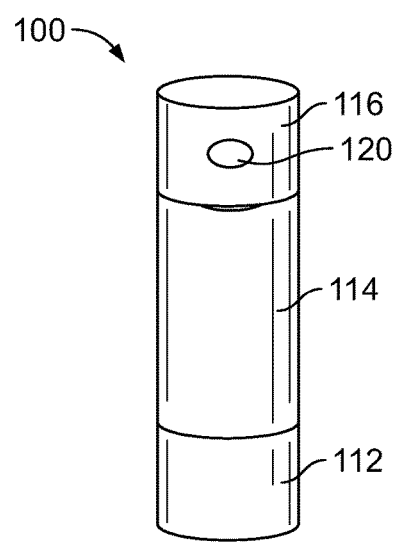
FIG. 7 is another exemplary monitor assembly of the present disclosure.

In another embodiment and as shown in FIG. 7, it is noted that monitor assembly 100 may not be character-based. As shown in FIG. 7, monitor assembly 100 takes the form a substantially cylindrical monitor assembly 100, and includes base portion 112, flexible portion 114 and upper portion 116. It is noted that monitor assembly 100 can take a variety of shapes/forms. As similarly discussed above in connection with monitor assembly 10, the flexible portion 114 of monitor assembly 100 is configured and dimensioned to be positioned into various desired positions for a wide range of different viewing angles and/or locations for monitoring purposes of monitor member 120 of upper portion 116 of monitor assembly 100.

As noted and referring again back to FIG. 1, exemplary upper portion 16 can include an eye member 18. As shown in FIG. 1, monitor member 20 can be positioned/mounted within or near the eye member 18. In exemplary embodiments, the lens of monitor member 20 is positioned/mounted within a pupil area 22 of eye member 18.

In other embodiments, it is noted that monitor member 20 can be positioned/mounted within an area 24 of eye member 18 that surrounds the pupil area 22 (e.g., the iris or sclera area 24 of eye member 18). In alternative embodiments, it is noted that monitor member can be positioned/mounted on other suitable areas of upper portion 16 (e.g., not positioned/mounted within an area 22, 24 of eye member 18).

In certain embodiments, areas or regions of eye member 18 (e.g., pupil area 22, and/or area 24 surrounding pupil area 22) can include one or more lighting components 26 (e.g., one or more LEDs 26, etc.). In general, each lighting component 26 is configured and adapted to glow and/or blink (e.g., be turned off/on), and in some embodiments can be sensitive to (e.g., glow or blink in response to) motion/touch (e.g., via a motion/touch sensor 77). Lighting component 26 can also be sensitive to (e.g., glow or blink in response to) other triggers (e.g., low battery level of assembly 10, time of day, touch, weather information, pollen measurements/information, sounds, etc.). For example, the one or more lighting components 26 can display different illumination levels and/or illumination patterns based upon the battery level of assembly 10, as similarly described and disclosed in U.S. patent application Ser. No. 14/694,905, the entire contents of which is hereby incorporated by reference in its entirety.

In some embodiments and as shown in FIG. 2, areas or regions of eye member 18 (e.g., pupil area 22, and/or area 24 surrounding pupil area 22) can include an LCD screen 27. In general, LCD screen 27 can be configured and adapted to glow and/or blink (e.g., be turned off/on), and in some embodiments can be sensitive to (e.g., glow or blink in response to) motion (e.g., via a motion sensor 77). LCD screen 27 can also be sensitive to (e.g., glow or blink in response to) other triggers (e.g., low battery level of assembly 10, time of day, touch, weather, pollen measurements, sounds, etc.).

In some embodiments, areas or regions of eye member 18 (e.g., area 22 and/or 24) can include a two-way mirror.

In some embodiments and as shown in FIG. 1, body portion 12 (and/or neck portion 14) can include one or more lighting components 26 (e.g., one or more LEDs 26, etc.). In general, each lighting component 26 is configured and adapted to glow and/or blink (e.g., be turned off/on), and in some embodiments can be sensitive to (e.g., glow or blink in response to) motion (e.g., via a motion sensor 77). Lighting component 26 can also be sensitive to (e.g., glow or blink in response to) other triggers (e.g., low battery level of assembly 10, time of day, touch, weather, pollen measurements, sounds, etc.).

In exemplary embodiments, each lighting component 26 is configured to glow and light up at least portions of assembly 10 (e.g., substantially light up assembly 10). For example, portions of assembly 10 can be fabricated from a translucent material or the like to facilitate lighting component 26 to substantially light up assembly 10.

In some embodiments, lighting component 26 (and or component 27) can be programmed to light up to a certain light level at certain times. In this way, assembly 10 can be utilized by the child as both a nightlight, and as a tool to help children learn when to go to bed or stay in bed. For example, lighting component 26 and/or 27 can be programmed to switch from a first lighting level (e.g., high lighting level) to a second lighting level (e.g., a very dim or off lighting level) at a certain time (e.g., at bedtime). The lighting component 26 and/or 27 can also be programmed to switch from the second lighting level to the first lighting level at a certain time (e.g., in the morning when it is time to wake up). Thus, a child utilizing assembly 10 can learn that when they wake up in the middle of the night and the assembly 10 is not at the first lighting level, it is not time to wake up and get out of bed. The child can also learn that when the assembly 10 switches from the first to the second lighting level, it is time to go to bed. Likewise, the child can also learn that when the assembly 10 switches from the second to the first lighting level, it is time to wake up and to get out of bed.

Additionally, the assembly 10 can provide a nightlight functionality to the child and/or user (e.g., parent), with the lighting component 26 and/or 27 configured and adapted to glow and/or blink in response to motion or other triggers (e.g., at a third or dim lighting level during the motion). Thus, exemplary assembly 10 advantageously provides a monitor member 20 for monitoring purposes and provides an assembly having the above-noted night-light and lighting functionalities, while also assembly 10 provides a visually appealing assembly 10 to the child/user (e.g., provides a visually appealing assembly 10 that does not appear like a conventional monitor assembly or security camera or the like).

Figure 8:
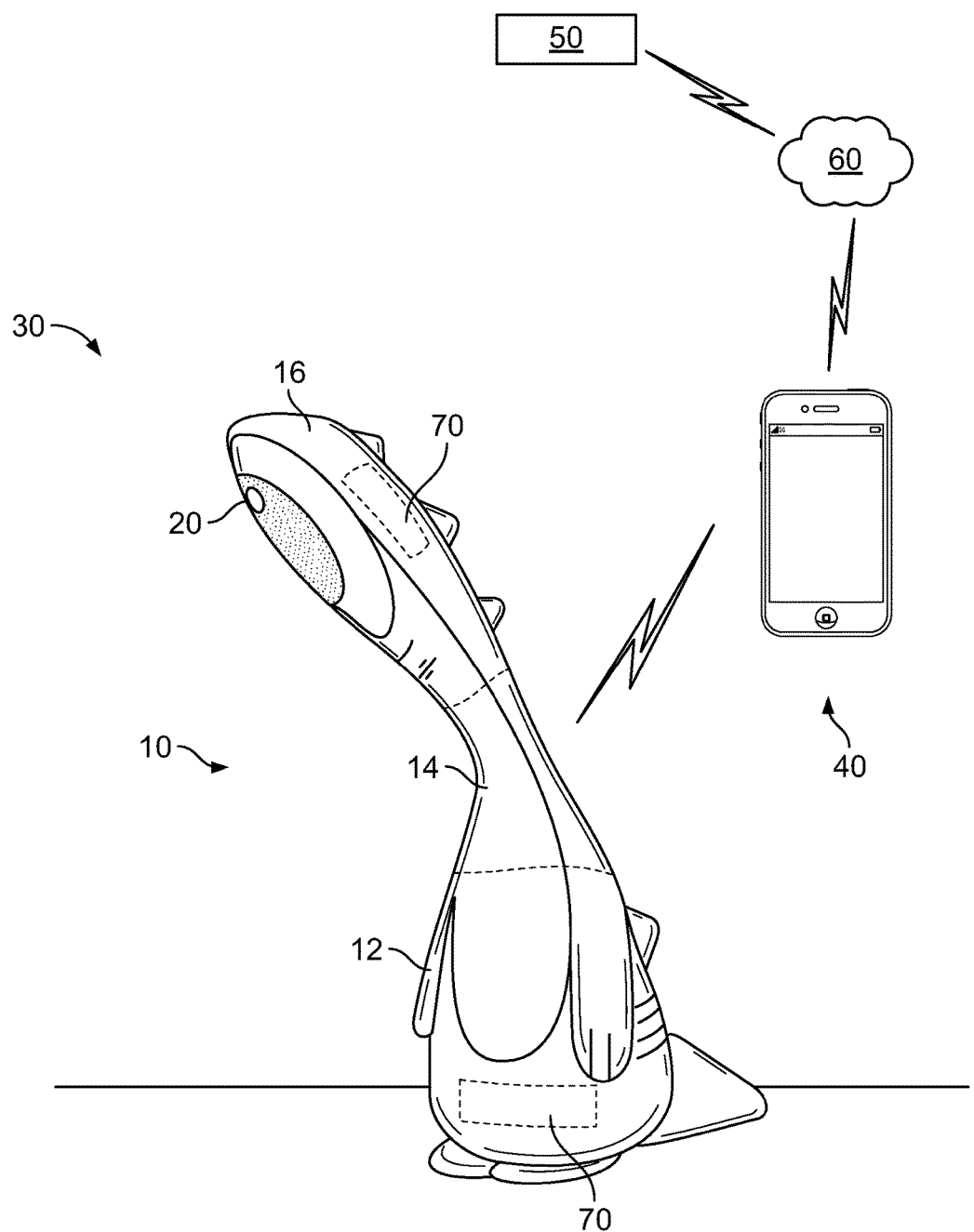
FIG. 8 depicts a monitoring system according to the present disclosure.

FIG. 8 depicts an exemplary monitoring system 30 that can be implemented using hardware, software, and/or a combination thereof. The system 30 can be configured and adapted for monitoring purposes by utilizing one or more monitor assemblies 10, 10', 10", 100, 1000.

In general, the system 30 includes one or more monitor members 20 of each monitor assembly 10, and can utilize electronic devices 30 (e.g., mobile phones, tablets, laptops, wearables, etc.) that are configured to communicate with one or more of the monitor assemblies 10, 10', 10", 100, 1000 (e.g., communicate with one or more of the monitor members 20). In some embodiments, the system 30 can include a remote user system 50 that can be accessible by users via a communications network 60 or the like.

In general, the monitor members 20 are configured and adapted to record video/images and/or capture still images. In some embodiments, each monitor member 20 may be configured and adapted to take instant photographs, and can include night vision or the like.

The monitor assembly 10, 10', 10", 100, 1000 can transmit and/or stream the video/images, direct or indirectly, to one or more of the electronic devices 40. In some embodiments, the monitor assembly 10, 10', 10", 100, 1000 can transmit information and/or messages to electronic devices 40, and/or to other monitor assemblies 10, 10', 10", 100, 1000. In certain embodiments, the monitor assembly 10, 10', 10", 100, 1000 can communicate with the electronic devices or the like described and disclosed in U.S. patent application Ser. Nos. 14/694,905 and 14/327,804, the entire contents of each being hereby incorporated by reference in their entireties.

Each monitor assembly 10, 10', 10", 100, 1000 can be associated with a unique identifier. The unique identifier can be included in transmissions by the monitor assembly 10, 10', 10", 100, 1000 and can be used by the one or more electronic device 40 and/or the remote system 50 to associate the transmissions with the corresponding assembly 10, 10', 10", 100, 1000. In exemplary embodiments, the unique identifier can be a sequence or string of alphanumeric characters.

The one or more electronic devices 40 can use the video/images and/or transmitted information for monitoring purposes, and to render one or more graphical user interfaces to display the video/images and/or transmitted information as well as other data maintained, generated, and/or received by the one or more electronic devices 40. In exemplary embodiments, the monitor assemblies 10, 10', 10", 100, 1000 and the electronic devices 40 can transmit and/or receive wireless transmissions according to the BlueTooth® communication protocol, Zigbee® communication protocol, the Wi-Fi® communication protocol, and/or any other suitable communication protocols.

The remote system 50 can include one or more computing devices operating as servers to manage data/information from monitor assembly 10, 10', 10", 100, 1000, and/or any other data/information associated with the monitor assembly 10, 10', 10", 100, 1000. In exemplary embodiments, the electronic devices 40 and/or monitor assemblies 10, 10', 10", 100, 1000 can communicate with the remote system 50 to transmit and receive information.

The electronic device 40 can store/access the monitoring information (e.g., monitoring information associated with the monitor member 20), and can render one or more GUIs and/or applications that can be viewed/utilized by the user, as desired.

In some embodiments, the electronic device 40 can transmit the monitoring information to the remote system 50 for further processing and/or storage. The user may access the remote system 50 through the electronic device 40 and/or another electronic device (e.g., a laptop, desktop, or personal computer) to review, modify, update, delete, share, and the like, the monitoring information captured by the system 30.

In exemplary embodiments, the monitor assembly 10, 10', 10", 100, 1000 (e.g., base portion 12 and/or upper portion 16) can house module circuitry 70 that can be programmed and/or configured to perform one or more operations, tasks, functions, and/or processes described herein.

Figure 9:
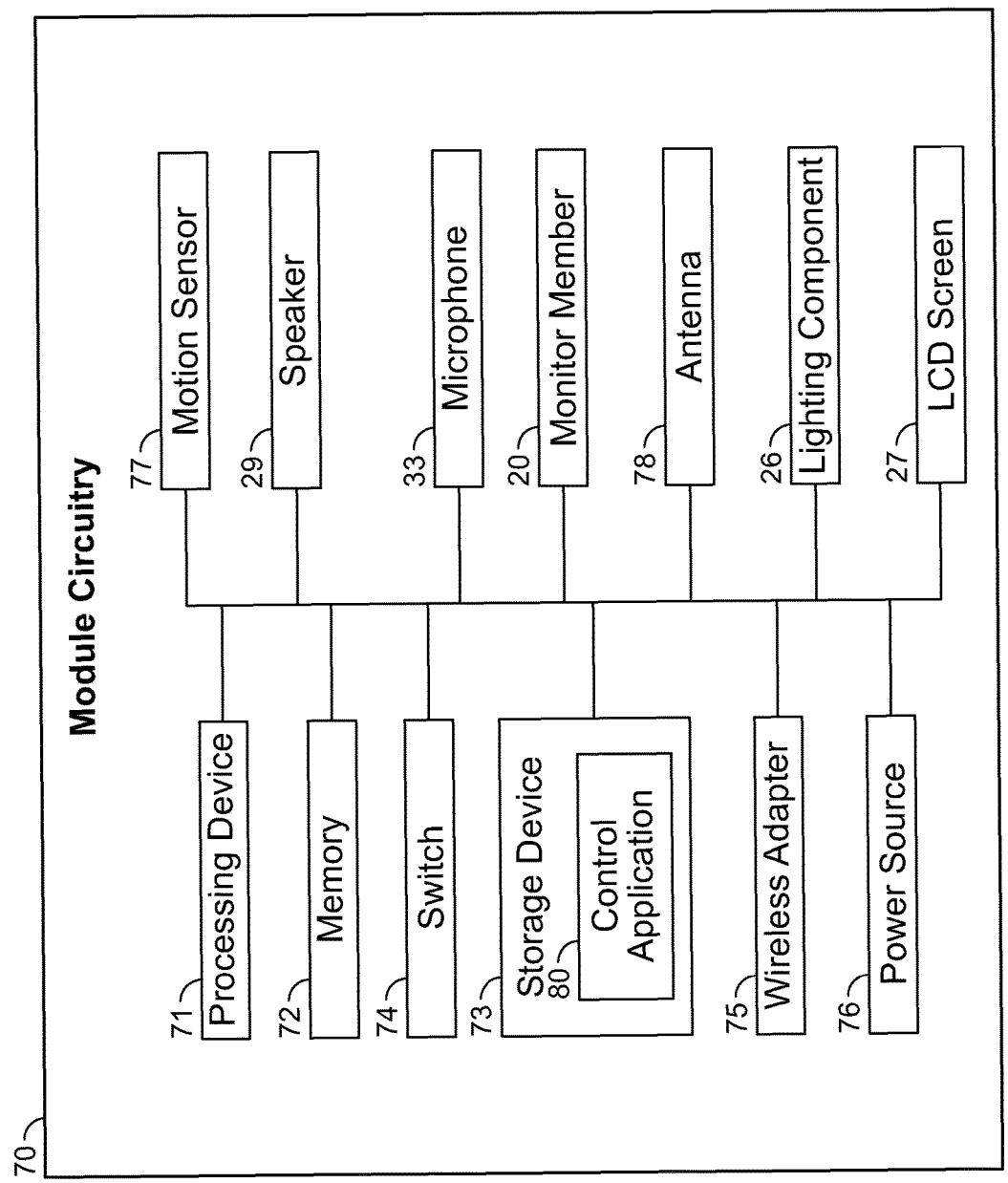
FIG. 9 is a block diagram of exemplary module circuitry that can be disposed with the monitor assemblies of the present disclosure.

FIG. 9 is a block diagram of an exemplary embodiment of module circuitry 70 that can be disposed within the monitor assembly 10, 10', 10", 100, 1000 (e.g., within base portion 12 and/or upper portion 16) of FIG. 8.

The module circuitry 70 can include and/or be associated with a processing device 71, memory 72 (e.g., RAM), a storage device 73, a switch 74, a wireless adapter/transceiver 75, and a power source 76. In some embodiments, one or more of these elements 71, 72, 73, 74, 75 and/or 76 are disposed within base portion 12, and/or within upper portion 16.

In some embodiments, the module circuitry 70 can include and/or be associated with a motion sensor 77, speaker 29, microphone 33, monitor member 20, antenna 78, lighting components 26 and/or LCD screen 27. In some embodiments, one or more of these elements 77, 29, 33, 20, 78, 26 and/or 27 are disposed within base portion 12, and/or within upper portion 16.

The wireless adapter/transceiver 75 (e.g., RF transceiver 75) can be configured to transmit and/or receive wireless transmissions via an antenna 78. For example, the transceiver 75 can be configured to transmit information/messages, directly or indirectly, to one or more electronic devices (e.g., electronic devices 40) and/or to receive information/messages, directly or indirectly, from one or more electronic devices. The transceiver 75 can be configured to transmit and/or receive information/messages having at a specified frequency and/or according to a specified sequence and/or packet arrangement. As one example, the transceiver 75 can be a BlueTooth® transceiver configured to conform to a BlueTooth® wireless standard for transmitting and/or receiving short-wavelength radio transmissions typically in the frequency range of approximately 2.4 gigahertz (GHz) to approximately 2.48 GHz. As another example, the transceiver 75 can be a Wi-Fi transceiver (e.g., as defined IEEE 802.11 standards), which may operate in an identical or similar frequency range as BlueTooth®, but with higher power transmissions. Some other types of transceivers 75 that can be implemented include RF transceivers configured to transmit and/or receive transmissions according to the Zigbee® communication protocol, and/or any other suitable communication protocol.

The storage device 73 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, a control application 80 can be embodied as computer-readable/executable program code stored on the non-transitory computer-readable storage device 73 and implemented using any suitable, high or low level computing language and/or platform, such as, e.g., Java, C, C++, C#, assembly code, machine readable language, and the like.

The memory 72 can include any suitable non-transitory computer-readable storage medium (e.g., random access memory (RAM), such as, e.g., static RAM (SRAM), dynamic RAM (DRAM), and the like). In some embodiments, the data/information and/or executable code for implementing the control application 80 can be retrieved from the storage device 73 and copied to memory 72 during and/or upon implementation of the processes of the present disclosure. Once the data/information has be used, updated, modified, replaced, and the like, the data/information may be copied from memory 72 to the storage device 73.

The processing device 71 can include any suitable single- or multiple-core microprocessor of any suitable architecture that is capable of implementing and/or executing the control application 80. The processing device 71 can be programmed and/or configured to execute the control application 80 to implement one or more processes of assembly 10 (e.g., monitoring, lighting, utilizing the speaker/microphone/LCD screen, motion sensing), and communicating (e.g., via the transceiver 75) information to other devices (e.g., the electronic device 40). For example, transceiver 75 can be configured to wirelessly transmit monitor member 20 information/data/images from assembly 10, 10', 10", 100, 1000 to a remote computer system (e.g., system 50) or device (e.g., device 40).

The processing device 71 can retrieve information/data from, and store information/data to, the storage device 73 and/or memory 72. For example, recorded video/images and/or information, motion sensor information, lighting information, and/or speaker/microphone/LCD screen information and/or any other suitable information/data for implementing the control application 50 or that may be used by the application 50 may be stored on the storage device 73 and/or memory 72.

In exemplary embodiments, the processing device 71 can be programmed to execute the control application 50 to receive, process and/or edit information/data from the monitor member 20, transceiver 75, storage device 73, memory 72, motion sensor 77, speaker 29, microphone 33, lighting components 26 and/or LCD screen 27.

The processing device 71 can be programmed to output information/data to the monitor member 20, transceiver 75, storage device 73, memory 72, motion sensor 77, speaker 29, microphone 33, lighting components 26 and/or LCD screen 27 based on the execution of the control application 50.

As an example, the processing device 71 can receive information/data from the motion/touch sensor 77 corresponding to motion/touch detected, and can transmit the information to the lighting components 26 and/or LCD screen 27 (e.g., to illuminate or blink for a pre-determined amount of time due to the detected motion). More particularly and as discussed above, lighting component 26 can be configured and adapted to glow and/or blink (e.g., be turned off/on), and in some embodiments can be sensitive to (e.g., glow or blink in response to) motion/touch (e.g., via a motion/touch sensor 77). Lighting component 26 can also be sensitive to (e.g., glow or blink in response to) other triggers (e.g., low battery level of assembly 10, time of day, weather information, pollen measurements/information, sounds, etc.). For example, the one or more lighting components 26 can display different illumination levels and/or illumination patterns based upon the battery level of assembly 10, 10', 10", 100, 1000 as similarly described and disclosed in U.S. patent application Ser. No. 14/694,905, the entire contents of which is hereby incorporated by reference in its entirety.

As another example, the processing device 71 can receive information/data/images from the monitor member 20, and can transmit the information/data/images to the electronic device 40 via the transceiver 75.

A user or users can also utilize electronic devices 40 (and/or system 50) for controlling the assembly 10, 10', 10", 100, 1000. As noted, each electronic device 40 can store/access the monitoring information (e.g., monitoring information associated with the monitor member 20), and can render one or more GUIs and/or applications that can be viewed/utilized by users, as desired.

As such, a user utilizing such an application or GUI or the like on device 40 can send information and/or control signals/commands to assembly 10, 10', 10", 100, 1000 (e.g., to processing device 71 via transceiver 75) for various commands/functions. For example, a user could send a command to assembly 10, 10', 10", 100, 1000 and request that the monitor member 20 take a picture/image/recording, and then send the picture/image/recording to the device 40 (e.g., via transceiver 75). A user could then utilize the picture/image/recording as desired (e.g., saving/editing the picture/image/recording on the device 40, sharing it via social media, utilizing with Facetime, etc.). It is also noted that the application/GUI running/operated on device 40 can include parental and/or child controls.

As noted, lighting component 26 and/or screen 27 can be sensitive to (e.g., glow or blink in response to) other triggers (e.g., time of day, weather information, pollen measurements/information, sounds, birthday information, etc.). Such information can be transmitted to assembly 10, 10', 10'', 100, 1000 via device 40. For example, the lighting components 26 and/or screen 27 may dim to a lower based on time of day (e.g., night-time). As another example, lighting components 26 and/or screen 27 may flash or blink based on a calendar event (e.g., a user's birthday). As another example, a user could send a command signal/request to assembly 10, 10', 10'', 100, 1000 (via the application running on device 40) and request that lighting/illumination level of lighting components 26 and/or screen 27 be adjusted as desired (e.g., on, off, higher, lower, etc.).

In some embodiments, it is noted that assembly 10, 10', 10'', 100, 1000 can include controls (e.g., external controls) that are configured and adapted to override at least some of the commands/requests sent via a user utilizing the application/GUI on device 40. In some embodiments, assembly 10, 10', 10'', 100, 1000 can include user-friendly controls or the like (e.g., external/exterior buttons) for capacitive and/or other various commands/requests/actions (e.g., for taking a recording/picture/image via monitor member 20 and then sending directly to device 40, turning on/off or adjusting light 26 and/or screen 27, adjusting volume of microphone 33 and/or speaker 29, etc.). As such and in certain embodiments, assembly 10, 10', 10'', 100, 1000 could be used as a selfie-stick or the like (e.g., as a stand-alone camera). Assembly 10, 10', 10'', 100, 1000 may also include a port or the like configured to charge electronic devices 40 (e.g., mobile devices).

It is noted that application/GUI utilized on device 40 for controlling/communication with the assembly 10, 10', 10'', 100, 1000 can include features that allow further customization of the application/GUI utilized on device 40 (e.g., the application could include a developer kit or the like).

Assembly 10, 10', 10'', 100, 1000 could also be controlled via voice commands from a user (e.g., via voice-control programming or the like). In some embodiments, assembly 10, 10', 10'', 100, 1000 includes facial recognition programming or the like (e.g., to recognize and accept commands from selected/defined users).

The power source 76 can be implemented as a battery or capacitive elements configured to store an electric charge (e.g., a button cell lithium battery). The battery may be replaceable by the user. In some embodiments, the power source 76 can be a rechargeable power source, such as a battery or one or more capacitive elements configured to be recharged via a connection to an external power supply and/or to be recharged by an energy harvesting device.

The switch 74 can be operatively coupled to the processing device 71 to trigger one or more operations by the processing device 71. In some embodiments, the switch 71 can be implemented as a momentary push button, rocker, and/or toggle switch that can be activated by a user. For example, switch 74 can be activated by the user to instruct the processing device 71 to instruct monitor member 40 to take/record an image/photo/recording and then send it to device 40 via the transceiver 75.

FIGS. 10A-10B depict another exemplary monitor assembly 1000 (e.g., character-based monitor assembly 1000) of the present disclosure.

In general, monitor assembly 1000 includes an elongated section/portion 1014 that is not flexible/movable, and also includes upper/head portion 1016 extending from (e.g., integrally attached to) portion 1014. Assembly 1000 also can include base portion 1012. Portions 1014, 1016 may or may not rotate relative to base portion 1012 (and vice versa).

Similar to assembly 10, monitor assembly 1000 includes upper portion 1016 having an eye member 18 with a monitor member 20 for monitoring purposes.

Assembly 1000 (e.g., portions 1012, 1014 and/or 1016) can include a speaker 29 and a speaker vent 31, and can include a microphone to receive outside noise input and a microphone port.

Assembly 1000 (e.g., portions 1012, 1014 and/or 1016, such as areas or regions of eye member 18) of assembly 1000 can include one or more lighting components 26 and/or LCD screen 27, as discussed above in connection with assembly 10. As such, the assembly 1000 can provide a nightlight functionality to the child and/or user (e.g., parent), with the lighting component 26 and/or 27 configured and adapted to glow and/or blink (e.g., in response to motion or other triggers), as similarly discussed above in connection with assembly 10.

In exemplary embodiments, the monitor assembly 1000 (e.g., portions 1012, 1014 and/or 1016) can house module circuitry 70 that can be programmed and/or configured to perform one or more operations, tasks, functions, and/or processes described above.

Whereas the disclosure has been described principally in connection with monitor assemblies for monitoring children/infants, such description has been utilized only for purposes of disclosure and is not intended as limiting the disclosure. To the contrary, it is to be recognized that the disclosed monitor assemblies are capable of use for other monitoring/security purposes (e.g., for monitoring disabled persons, for monitoring elderly persons, for monitoring pets or other organisms, for monitoring valuables, for monitoring areas, rooms, houses and/or outdoor spaces/activities, etc.).

Although the assemblies, systems and methods of the present disclosure have been described with reference to exemplary embodiments thereof, the present disclosure is not limited to such exemplary embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:
1. A monitor assembly comprising:
a base portion;

an elongated flexible portion attached to and extending from the base portion, the elongated flexible portion extending from a first end to a second end, the elongated flexible portion deformable and bendable along the entire length from the first end to the second end;

an upper portion attached to and extending from the elongated flexible portion, the upper portion including an eye member, with a monitor member positioned within or near the eye member;

wherein the elongated flexible portion is configured and dimensioned to be positioned into various user-defined positions for a range of different viewing angles or locations for the monitor member of the eye member of the upper portion;

wherein the elongated flexible portion is configured and dimensioned to be flexed and moved to a position where at least a portion of the elongated flexible portion is wrapped 360° around an object;

wherein the base portion or the upper portion includes one or more lighting components;

wherein the one or more lighting components are configured to switch from a first lighting level to a second lighting level at a first pre-determined time; and wherein the one or more lighting components are configured to switch from the second lighting level to the first lighting level at a second pre-determined time.

2. The monitor assembly of claim 1, wherein the monitor assembly is a character-based monitor assembly with the base portion including a body portion;

wherein the elongated flexible portion includes an elongated flexible neck portion attached to and extending from the body portion; and wherein the upper portion includes a head portion attached to and extending from the elongated flexible neck portion, the head portion including the eye member.

3. The monitor assembly of claim 1, wherein a lens of the monitor member is positioned or mounted within a pupil area of the eye member; and wherein an area of the eye member surrounding the pupil area includes a lighting component or an LCD screen.

4. The monitor assembly of claim 1, wherein the base portion is configured and dimensioned to be mounted on a surface with a central axis of the base portion and a central axis of the upper portion substantially positioned together; and wherein the elongated flexible portion is configured and dimensioned to be flexed and moved toward the surface to a user-defined position with the central axis of the upper portion angled at a user-defined angle relative to the central axis of the base portion.

5. The monitor assembly of claim 4, wherein the central axis of the upper portion is angled from at least 45° to 90° relative to the central axis of the base portion.

6. The monitor assembly of claim 4, wherein the elongated flexible portion is configured and dimensioned to be flexed and moved toward the surface to a user-defined position with the upper portion contacting the base portion.

7. The monitor assembly of claim 1, wherein the elongated flexible portion and the upper portion are configured and dimensioned to be rotated and moved from 180° to 360° in a first rotational direction around a central axis of the base portion; and wherein the elongated flexible portion and the upper portion are configured and dimensioned to be rotated and moved from 180° to 360° in a second rotational direction around the central axis of the base portion.

8. The monitor assembly of claim 3, wherein the base portion or the upper portion includes a motion sensor; and wherein after the motion sensor senses motion, the lighting component or the LCD screen is configured and adapted to illuminate or blink.

9. The monitor assembly of claim 1, wherein the upper portion or the base portion includes a wireless adapter, the wireless adapted configured to wirelessly transmit information, images or recordings from the monitor member to a remote electronic device; and wherein the remote electronic device is configured to send command signals to the wireless adapter to control the monitor member.

10. A monitoring method comprising:

providing a monitor assembly having a base portion, an elongated flexible portion attached to and extending from the base portion and an upper portion attached to and extending from the elongated flexible portion, the upper portion including an eye member, with a monitor member positioned within or near the eye member;

wherein the elongated flexible portion extends from a first end to a second end, the elongated flexible portion deformable and bendable along the entire length from the first end to the second end;

wherein the elongated flexible portion is configured and dimensioned to be positioned into various user-defined positions for a range of different viewing angles or locations for the monitor member of the eye member of the upper portion; and positioning the elongated flexible portion into one of the user-defined positions for monitoring purposes via the monitor member;

wherein the elongated flexible portion is configured and dimensioned to be flexed and moved to a position where at least a portion of the elongated flexible portion is wrapped 360° around an object;

flexing and moving the elongated flexible portion to a position where at least a portion of the elongated flexible portion is wrapped 360° around an object; and wherein the base portion or the upper portion includes one or more lighting components;

wherein the one or more lighting components are configured to switch from a first lighting level to a second lighting level at a first pre-determined time; and wherein the one or more lighting components are configured to switch from the second lighting level to the first lighting level at a second pre-determined time.

11. The method of claim 10, wherein the monitor assembly is a character-based monitor assembly with the base portion including a body portion;

wherein the elongated flexible portion includes an elongated flexible neck portion attached to and extending from the body portion; and wherein the upper portion includes a head portion attached to and extending from the elongated flexible neck portion, the head portion including the eye member.

12. The method of claim 10, wherein a lens of the monitor member is positioned or mounted within a pupil area of the eye member; and wherein an area of the eye member surrounding the pupil area includes a lighting component or an LCD screen.

13. The method of claim 10, further comprising mounting the base portion on a surface with a central axis of the base portion and a central axis of the upper portion substantially positioned together; and flexing and moving the elongated flexible portion toward the surface to a user-defined position with the central axis of the upper portion angled at a user-defined angle relative to the central axis of the base portion.

14. The method of claim 13, wherein the central axis of the upper portion is angled from at least 45° to 90° relative to the central axis of the base portion.

15. The method of claim 13, wherein the elongated flexible portion is flexed and moved toward the surface to a user-defined position with the upper portion contacting the base portion.

16. The method of claim 10, further comprising rotating and moving the elongated flexible portion and the upper portion from 180° to 360° in a first rotational direction around a central axis of the base portion; and
   rotating and moving the elongated flexible portion and the upper portion from 180° to 360° in a second rotational direction around the central axis of the base portion.

17. The method of claim 12, wherein the base portion or the upper portion includes a motion sensor; and
   wherein after the motion sensor senses motion, the lighting component or the LCD screen is configured and adapted to illuminate or blink.

18. The method of claim 10, wherein the upper portion or the base portion includes a wireless adapter, the wireless adapted configured to wirelessly transmit information, images or recordings from the monitor member to a remote electronic device; and
   further comprising sending command signals from the remote electronic device to the wireless adapter to control the monitor member.

19. A character-based monitor assembly comprising:
   a body portion and an elongated flexible neck portion attached to and extending from the body portion, with a head portion attached to and extending from the elongated flexible neck portion, the head portion including an eye member, with a monitor member positioned within or near the eye member;
   wherein the elongated flexible neck portion is configured and dimensioned to be positioned into various user-defined positions for a range of different viewing angles or locations for the monitor member of the eye member of the head portion;
   wherein the elongated flexible portion extends from a first end to a second end, the elongated flexible portion deformable and bendable along the entire length from the first end to the second end;
   wherein a lens of the monitor member is positioned or mounted within a pupil area of the eye member, and an area of the eye member surrounding the pupil area includes a first lighting component or an LCD screen;
   wherein the body portion or the head portion includes a motion sensor, and after the motion sensor senses motion, the first lighting component or the LCD screen is configured and adapted to illuminate or blink;
   wherein the body portion is configured to be mounted on a surface with a central axis of the body portion and a central axis of the head portion substantially positioned together;
   wherein the elongated flexible neck portion is configured and dimensioned to be flexed and moved toward the surface to a user-defined position with the central axis of the head portion angled at a user-defined angle relative to the central axis of the body portion;
   wherein the elongated flexible neck portion and the head portion are configured and dimensioned to be rotated and moved from 180° to 360° in a first rotational direction around a central axis of the base portion;
   wherein the elongated flexible neck portion and the head portion are configured and dimensioned to be rotated and moved from 180° to 360° in a second rotational direction around the central axis of the body portion;
   wherein the head portion or the body portion includes a wireless adapter, the wireless adapted configured to wirelessly transmit information, images or recordings from the monitor member to a remote electronic device;
   wherein the remote electronic device is configured to send command signals to the wireless adapter to control the monitor member;
   wherein the elongated flexible portion is configured and dimensioned to be flexed and moved to a position where at least a portion of the elongated flexible portion is wrapped 360° around an object;
   wherein the body portion includes a second lighting component;
   wherein the second lighting component is configured to switch from a first lighting level to a second lighting level at a first pre-determined time; and
   wherein the second lighting component is configured to switch from the second lighting level to the first lighting level at a second pre-determined time.

* * * * *